United States Patent [19]

Carson et al.

[11] Patent Number: 4,711,338

[45] Date of Patent: Dec. 8, 1987

[54] LID FEEDING MACHINE

[75] Inventors: David E. Carson; Gary A. Barnhart, both of Lawrence, Kans.

[73] Assignee: Carson/Burger/Weekly, Inc., Lawrence, Kans.

[21] Appl. No.: 921,903

[22] Filed: Oct. 24, 1986

Related U.S. Application Data

[63] Continuation of Ser. No. 698,885, Feb. 2, 1985, abandoned.

[51] Int. Cl.4 ............................................. B65G 47/14
[52] U.S. Cl. ..................................... 198/396; 198/443; 198/817
[58] Field of Search ............... 198/626, 604, 607, 443, 198/454, 786, 394, 396, 389, 415, 817; 414/257, 222

[56] References Cited

U.S. PATENT DOCUMENTS 3,776,346 12/1973 Dubuit ................................ 198/396
3,986,604 10/1976 Siryj ..................................... 198/395

FOREIGN PATENT DOCUMENTS 1143776 10/1957 France .............................. 198/626

Primary Examiner—Robert J. Spar
Assistant Examiner—Darrell G. Dayoan
Attorney, Agent, or Firm—Schmidt, Johnson, Hovey & Williams

[57] ABSTRACT

A machine for feeding injection molded plastic lids from a gathering area to which they have been delivered in either scrambled or stacked relationship to a delivery point where the lids are oriented for subsequent delivery to a lid stacking machine or to a point of use. The lid feeding machine comprises a first driven belt in a generally horizontal plane but slightly inclined with respect to the horizontal on its longitudinal axis and a second driven belt in a generally vertical plane but also slightly inclined with respect to the horizontal on its longitudinal axis, the belts being juxtaposed in approximately 90° angular relationship on their transverse axes, whereby when lids are delivered to the gathering area, which is at one end of the first belt, they are moved, by the first belt, toward the second belt and are then engaged by the second belt to insure separation and vertical orientation thereof and, as engaged by the second belt, are driven along a lid feed path toward a point of delivery which is at the other end of the first and second belts. The normally lowermost end of the longitudinal axis of the first belt defines the gathering area and the uppermost end of the longitudinal axis of the second belt is adjacent the gathering area. The belts span the distance between the gathering area and the point of delivery, with the uppermost, other end of the first belt being at the delivery area and the lowermost, other end of the second belt being adjacent the delivery area.

18 Claims, 5 Drawing Figures

LID FEEDING MACHINE

This application is a continuation of application Ser. No. 698,885, filed Feb. 6, 1985, now abandoned.

FIELD OF THE INVENTION

This invention relates to equipment for handling lids such as molded plastic lids, which lids normally have a top, and a skirt depending therefrom in circumferential relationship thereto. The lids are initially delivered to a gathering area either in scrambled fashion or in stacked relationship. The lid feeding machine is designed to move the lids individually from a group in the gathering area toward a delivery point where they may be finally oriented for stacking or subsequent use. The lids are unscrambled, or disengaged from one another if in interlocked relationship when scrambled or stacked, in the gathering area, by a first belt as they are moved toward a second belt and are subsequently moved, in individual aligned relationship, by the second belt, along a feed path to the delivery point where they are then gripped or grasped by orienting wheels to place the lids in the same relative orientation to be fed to a printing, capping or similar operation.

BACKGROUND OF THE INVENTION

Various methods of separating and individually delivering molded plastic lids have been devised over the years; such as, machines operating on a centrifugal force basis and various other mechanical devices, but none have been fully satisfactory in functioning to separate a group of lids which are in either scrambled or stacked relationship in a gathering area and separating the lids to place the same into individually aligned, vertically positioned, on edge relationship and moving the lids to a point of delivery where the lids, in such on edge relationship, may be grasped by suitable orienting wheels whereby to orient the lids in the same relative relationship prior to depositing the same on a stacking unit or feeding the lids to another, further operation.

SUMMARY OF THE INVENTION

The lid feeding machine herein disclosed operates to separate a group of lids which have been delivered to a gathering area, either directly, in stacked relationship, or from a molding machine in scrambled fashion and in vertical and horizontal positions, the lids being moved by the machine from the gathering area in individual separated relationship to a point of delivery for subsequent stacking or use. The lid feeding machine includes a first driven belt which is in a generally horizontal plane but slightly longitudinally inclined with respect to the horizontal and a second driven belt in a generally vertical plane but slightly longitudinally inclined with respect to the horizontal, the first and the second belts being juxtaposed in angular relationship whereby lids which are delivered to a gathering area on one end of the first belt will be driven, by said first belt, toward engagement with the second belt and, when engaged by the second belt, will be driven along the first belt to a point of delivery. The belts are driven in the same direction from a common source and at approximately the same speed whereby to handle the lids in the aforementioned fashion and continually maintain a flow of lids from the gathering area to the delivery point.

DESCRIPTION OF THE PREFERRED EMBODIMENT

Figure 2:
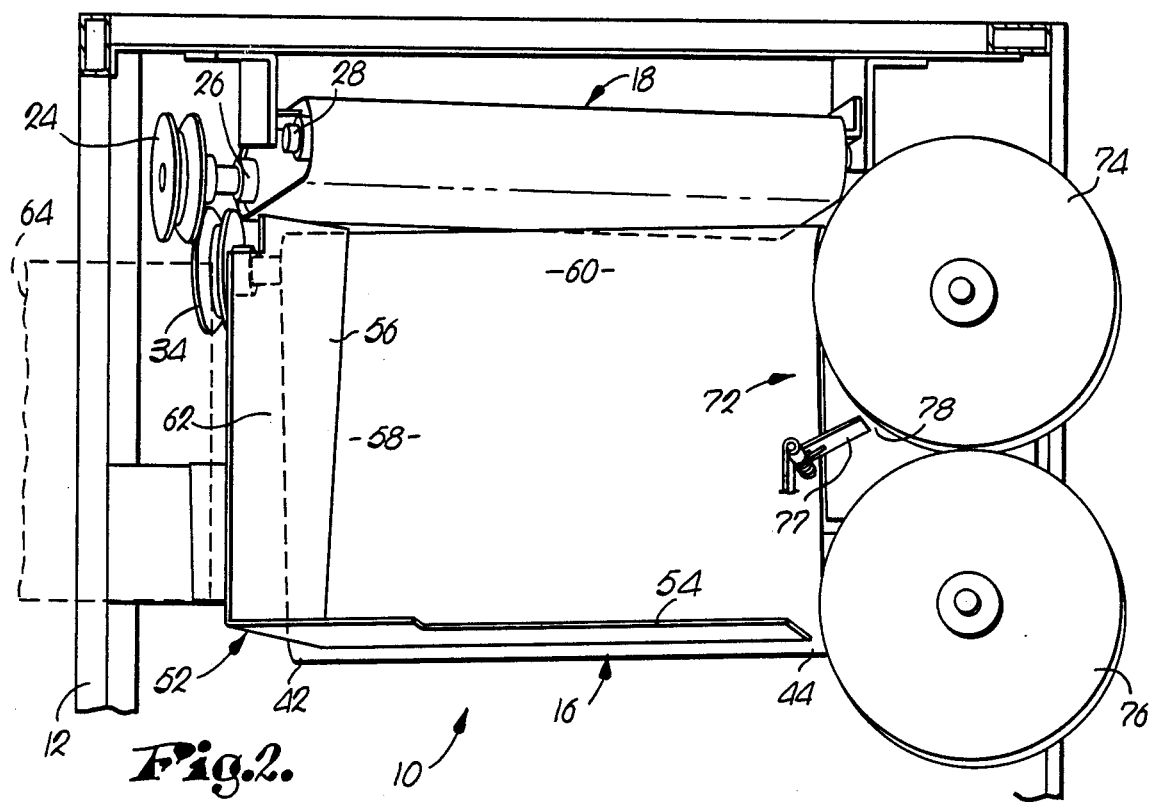
FIG. 2 is a fragmentary, top plan view with parts being broken away and showing the lid feeding machine.

The lid feeding machine, broadly designated by the numeral 10, is normally intended to be interposed, in a plastic molding plant for instance, between the injection molding machine which fabricates the lids and a stacking machine where the lids, when all similarly oriented may be packed and shipped to a point of use, although it will be appreciated that the machine could transport the lids from a stacked relationship directly to a point of use such as a printing or capping machine.

The machine 10 includes a supporting frame 12 which is only partially shown in the drawing, the frame 12 supporting a prime mover (not shown) which operates a driven shaft 14. The frame carries a first belt 16 and a second belt 18 which are suitably supported by the frame 12, whereby they may be ultimately driven by the prime mover through shaft 14 and a belt drive arrangement.

Figure 1:
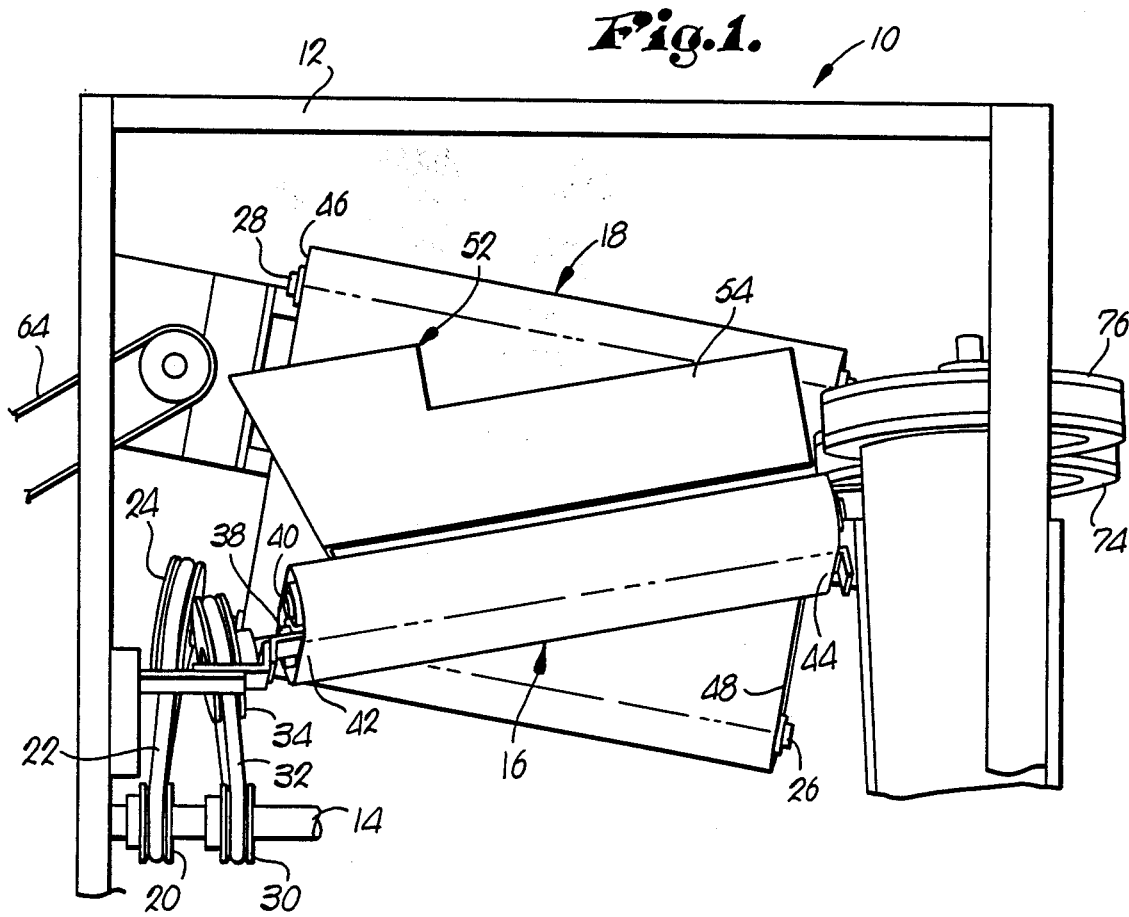
FIG. 1 is a fragmentary, generally side elevational view with parts being broken away to show the relationship of the first and second belts.
Figure 3:
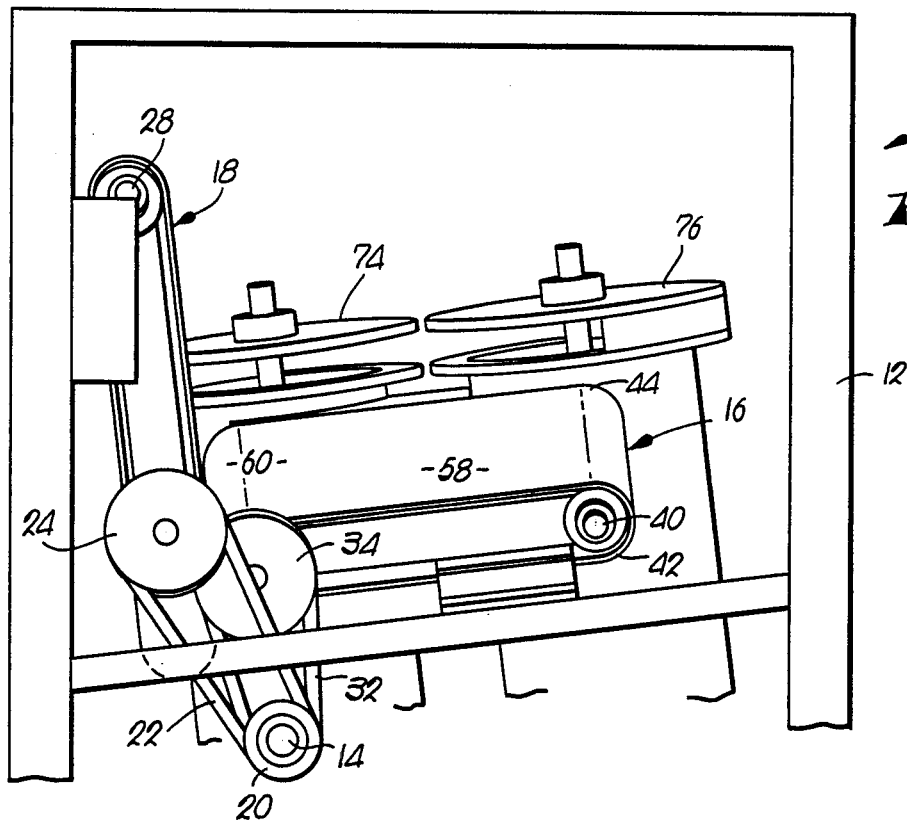
FIG. 3 is an end elevational view from the input end of the lid feeding machine and looking toward the delivery point.

Specifically, and as best shown in FIGS. 1 and 3, the driven shaft 14 has a first pulley 20 secured thereto which pulley 20 is coupled through a drive belt 22 to a second pulley 24 which pulley 24 is affixed to a driven roller 26 which carries second belt 18, the belt being trained over said driven roller 26 and an idler roller 28.

Similarly a pulley 30 is likewise secured to driven shaft 14 and connected by a drive belt 32 with a pulley 34 which is carried by the driven roller 38 of first belt 16. Belt 16 is also trained over an idler roller 40, the idler roller being suitably supported by the frame 12.

Thus, first belt 16 is trained over a driven roller 38 and an idler roller 40 and the second belt 18 is trained over a driven roller 26 and an idler roller 28, said rollers all being suitably supported by the frame 12 for rotating relationship whereby to cause the belts 16 and 18 to move in the direction of the arrows when the prime mover and, therefore, driven shaft 14 is placed into operation whereby to activate the lid feeding machine 10. As shown by the arrows in FIG. 5 for instance, the belts 16 and 18 are driven in the same direction for purposes which will hereinafter become apparent.

Figure 4:
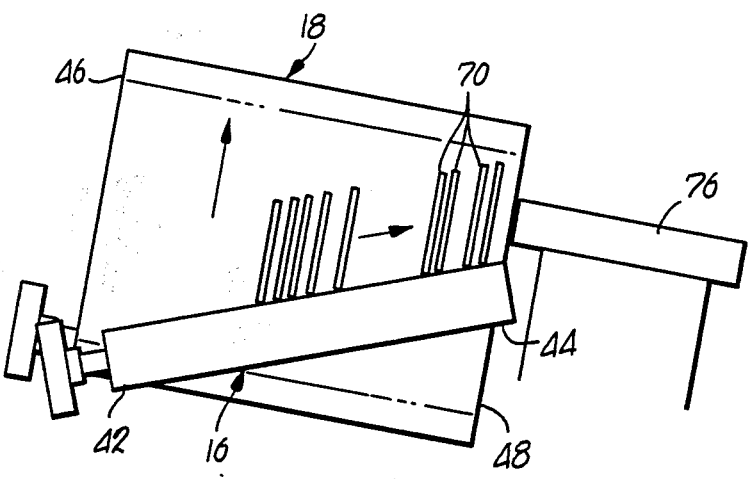
FIG. 4 is a schematic side elevational view, generally comparable to FIG. 1 but showing the lids as they move along the lid feed path from the gathering area to the delivery point.

The first belt 16 is in a generally horizontal plane but is inclined slightly from the horizontal as best shown in FIG. 4, such inclination being on the order of 5° to 30°. Thus, the first belt 16 presents one end 42 which is the normally lowermost end thereof when considering the longitudinal axis of the belt 16, the belt 16 presenting, at the opposite end of the longitudinal axis thereof, an uppermost other end 44.

Similarly, the second belt 18, which is disposed in a vertical plane, is slightly longitudinally inclined with respect to the horizontal, as best shown in FIG. 4, whereby to present one end 46 and the other end 48, the end 46 being the uppermost end of the belt, the other end 48 being the normally lowermost end of the belt, when considering the longitudinal axis of the belt which axis extends from one end 46 to other end 48. Here again, the degree of inclination with respect to the horizontal of the longitudinal axis of belt 18 is approximately 5° to 30° from end 46 to end 48 thereof.

Figure 5:
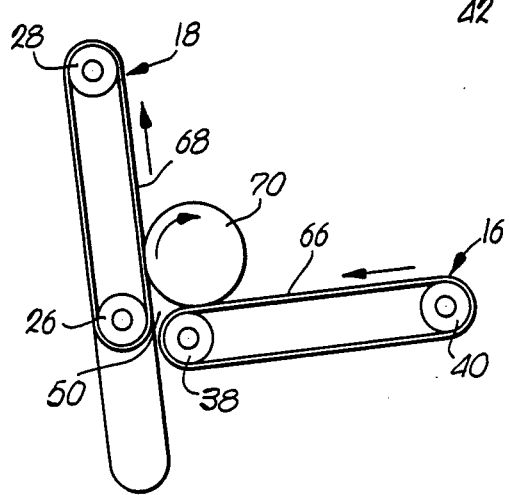
FIG. 5 is a schematic view showing the relative relationship of the first belt and the second belt, with a lid therebetween, the view being generally comparable to that of FIG. 3 of the drawing.

The belts 16 and 18, as shown in FIG. 5, are juxtaposed in angular relationship, the angle between the belts being on the order of 90° as shown at 50 in FIG. 5 of the drawing.

Each of the belts is fabricated of a synthetic rubber with a nylon backing, the surface of each of the belts being fabricated from a material which is tacky in nature whereby to present a high coefficient of friction.

A guide frame 52 overlies the first belt 16 and is suitably supported by the frame 12, the guide frame 52 including a first leg 54 which extends along the longitudinal axis of first belt 16 and a second leg 56 which extends along the transverse axis of first belt 16 and in normal relationship to the first leg 54. The legs 54 and 56 cooperate to define a gathering area 58 and a lid feed path 60.

The second leg 56 also serves as a lid slide plate 62 which extends from the end of a delivery conveyor 64 whereby lids delivered by conveyer 64 can slide down plate 62 into gathering area 58. When lids to be separated and individually fed by the machine 10 are delivered from the molding machine they are deposited, in scrambled, grouped relationship into the gathering area 58. The gathering area 58 is generally defined at the one end 42 of first belt 16 which is the normally lowermost end of belt 16. Inasmuch as the belts 16 and 18 are running at their predetermined speed, when a group of lids is delivered into the gathering area 58, the lids will be engaged by the surface 66 of first belt 16 at the normally lowermost end thereof and, by virtue of such engagement urged to separate, if interlocked, and will be carried by the first belt toward the second belt 18 inasmuch as first belt 16 is being driven in the direction of the arrow in FIG. 5.

If the lids are on edge, when they come into contact with the front surface 68 of second belt 18, they will be caused to spin in the direction of the arrow shown in FIG. 5 whereby the lids 70 are finally separated, if initially interlocked and each lid is rotated in the direction of the arrow and, by virtue of such rotation and the engagement of the circumferential edge or skirt of each lid 70 with the respective surfaces 66 and 68 of first belt 16 and second belt 18, will be moved or individually walked along the two juxtaposed belts in the manner shown in FIG. 4 of the drawing toward a delivery point 72.

If a lid 70 is flat on upper surface 66 of belt 16; that is, in a horizontal position, it will likewise be moved by belt 16, into contact with front surface 68 of belt 18. This contact, and the movement of the respective belts, will cause the lid to be moved to a vertical, upright position, as shown in FIG. 4 and to then be moved individually along the belts to a point of delivery. Thus, regardless of the position of a lid in the group in gathering area 58, it will ultimately be separated from any other lid, stood on edge and moved along the belts to the delivery point 72.

In the embodiment shown for illustration in the drawings, the delivery point 72 is generally defined by a pair of orienting rollers 74 and 76 at the end of the lid feed path 60. A gate 77 defines a restricted aperture 78 whereby a lid 70, in its upstanding position, may, at the end of path 60, be grasped by a vacuum which is pulled through the roller 74 and the lid moved past adjustable gate 77 through aperture 78 into engagement with both roller 74 and roller 76.

The structure and function of rollers 74 and 76 is known in that the same function to orient the lids so that the skirts thereof are all facing in the same direction prior to depositing the lids on a stacking unit which consists of rollers which receive the lids and group them in aligned similar relationship for packaging or use.

It will be noted that the first belt 16 and the second belt 18 maintain the individual lids 70 spaced and on edge as they are moved along the lid feed path 60 and through aperture 78 in engagement with the rollers 74 and 76 and that, as the lids move along path 60 they are tilted and in parallel relationship.

This is accomplished by positioning the gathering area 58 at one end 42 of first belt 16, which end 42 is the normally lowermost end of said belt 16 and the delivery point 72 at the other, normally uppermost end of belt 16 whereby there is an inclined path extending from the gathering area 58 upwardly to the delivery point 72, the delivery point 72 being in a plane higher than gathering area 58.

Second belt 18 has one end 46 thereof which is the uppermost end of the belt, with respect to the horizontal, as shown in FIG. 4, and the other end 48 of belt 18 which is at a lowermost point with respect to the horizontal when considering the longitudinal axis of the belt 18.

Thus, the longitudinal axis of belt 16 spans the distance from the gathering area 58 to the delivery point 72 and the longitudinal axis of belt 18 likewise spans the distance from the gathering area 58 to the delivery point 72.

There is a slight space between the two belts, as shown in FIG. 5, and as heretofore indicated, the belts are in approximately a 90° relationship on their transverse axes.

It has been found that little if any adjustment between the belts is necessary to accommodate lids of varying diameters and that the belts, when operating at the same speed, by virtue of being driven off of the same shaft 14, will serve to separate and vertically orient, by gyroscopic action, lids which have been deposited into the gathering area 58 in stacked relationship or from the molding machine delivery conveyor 64, along slide plate 62 and thence move the lids invidually in generally vertical, longitudinally aligned relationship, along lid feed path 60 to the point of delivery 72 and thence through aperture 78. This is accomplished by moving each lid from the gathering area 58 into engagement with the front surface 68 of belt 18 maintaining the edge of the lid 70 in point contact with the front surface 66 of the belt 16, whereby the respective relationships of the belts 16 and 18 will cause the lids to move along the feed path 60 and to the point of delivery 72.

We claim:

1. A lid feeding machine for receiving and separating a group of lids and for feeding the lids individually toward a delivery point, said machine comprising:
   a first driven planar belt lying in a first plane; and
   a second driven planar belt lying in a second plane, there being means for positioning said belts in a proximal relationship such that said planes intersect to define a juncture line at the intersection thereof and to define a juncture angle of less than 180° therebetween on one side of said juncture line, said first belt being driven in a first direction toward said second belt, said second belt being driven in a second direction outwardly from said one side, said belts being driven at substantially the same speed and at sufficient speed such that lids received by said machine will be driven by said first belt toward said second belt into simultaneous engagement by both of said belts and, when so engaged, will be moved to or maintained in a substantially vertical position, separated, and spun to thereby stabilize the lids in said position while being fed along both of said belts in a direction parallel to said juncture line toward the delivery point.

2. The machine as set forth claim 1 said juncture angle being about 90°.

3. The machine as set forth in claim 1, said first belt including a gathering area on which lids are received for movement by said first belt toward said second belt into said simultaneous engagement.

4. The machine as set forth in claim 3, further including an upright guide frame in overlying relationship to said first belt for guiding lids receiving by said machine onto said gathering area.

5. The machine as set forth in claim 1, said first belt sloping downwardly toward said second belt, said second belt sloping upwardly from said first belt.

6. The machine as set forth in claim 5, said belts presenting respective first and second axes defined as being respectively transverse to said first and second directions, said belts each including respective first and second ends located at opposed ends of said axes, said first axis being inclined relative to horizontal such that said first end of said first belt is generally lower than said second end thereof, said second axis being declined relative to horizontal such that said first end of said second belt is generally higher than said second end thereof.

7. The machine as set forth in claim 6, said first axis being inclined between about 5° and 30° relative to horizontal.

8. The machine as set forth in claim 6, said second axis being declined between about 5° and 30° relative to horizontal.

9. The machine as set forth in claim 5, said first belt being inclined slightly above horizontal toward said second belt in order to slope toward said second belt, said second belt being declined slightly from vertical and away from said first belt in order to slope upwardly from said first belt.

10. A lid feeding machine, comprising:
    a first belt presenting a first, substantially planar, lid-engaging stretch;
    a second belt presenting a second, substantially planar, lid-engaging stretch, there being means for positioning said belts in a proximal, obliquely oriented relationship with respect to one another with said stretches cooperatively defining therebetween a lid-engagement zone for simultaneous engagement of lids therein by both of said stretches, the included angle between said stretches being less than 180°; and
    means for driving said first stretch in a first direction toward said second stretch, for driving said second stretch in a second direction such that said stretches cooperatively impart the same relative rotational movement to the lids when the lids are simultaneously engaged with both of said stretches in order to move or maintain the lids in an upright position and to spin the lids to thereby stabilize the lids in said upright position, and for feeding the lids along both of said stretches in a direction generally transverse to both said first and second directions toward the delivery point.

11. The machine as set forth in claim 10, said included angle being about 90°.

12. The machine as set forth in claim 10, said first stretch including a gathering area on which lids are received for movement by said first stretch toward said second stretch for simultaneous engagement by both of said stretches.

13. The machine as set forth in claim 12, further including an upright guide frame in overlying relationship to said first belt for guiding lids received by said machine onto said gathering area.

14. The machine as set forth in claim 10, said first stretch sloping downwardly toward said second stretch, said second stretch sloping upwardly from said first stretch.

15. The machine as set forth in claim 14, said belts presenting respective first and second axes defined as being respectively transverse to said first and second directions, said stretches each including respective first and second ends located at opposed ends of said axes, said first axis being inclined relative to horizontal such that said first end of said first stretch is generally lower than said second end thereof, said second axis being declined relative to horizontal such that said first end of said second belt is generally higher than said second end thereof.

16. The machine as set forth in claim 15, said first axis being between about 5° and 30° relative to horizontal.

17. The machine as set forth in claim 15, said second axis being declined between about 5° and 30° relative to horizontal.

18. The machine as set forth in claim 14, said first stretch being inclined slightly above horizontal toward said second stretch, said second stretch being slightly declined from vertical away from said first stretch.

* * * * *